United States Patent [19]
Bronicki et al.

[11] Patent Number: 5,704,209
[45] Date of Patent: Jan. 6, 1998

[54] EXTERNALLY FIRED COMBINED CYCLE GAS TURBINE SYSTEM

[75] Inventors: Lucien Y. Bronicki, Yavne; Daniel Goldman, Raanana; Joseph Sinai, Ramat Gan, all of Israel

[73] Assignee: Ormat Industries Ltd., Yavne, Israel

[21] Appl. No.: 392,158

[22] Filed: Feb. 22, 1995

Related U.S. Application Data

[63] Continuation-in-part of Ser. No. 205,260, Mar. 3, 1994, abandoned, which is a continuation-in-part of Ser. No. 202,476, Feb. 28, 1994, abandoned.

[51] Int. Cl.$^6$ ................................................. F01K 25/02
[52] U.S. Cl. ................................ 60/650; 60/652; 60/682
[58] Field of Search ........................... 60/650, 652, 682, 60/39.03, 39.251, 39.463; 110/262, 186; 122/22

[56] References Cited

U.S. PATENT DOCUMENTS

| | | | |
|---|---|---|---|
| 3,446,012 | 5/1969 | Foster-Pegg | 60/39.02 |
| 3,747,335 | 7/1973 | Strub | 60/39.03 |
| 3,988,897 | 11/1976 | Strub | 60/682 |
| 4,761,957 | 8/1988 | Eberhardt et al. | 60/664 |
| 4,942,736 | 7/1990 | Bronicki | 60/641.12 |
| 5,309,492 | 5/1994 | Adams | 610/650 |

FOREIGN PATENT DOCUMENTS

| | | | |
|---|---|---|---|
| 3833832 | 4/1990 | Germany | 60/39.463 |
| 1626053 | 2/1991 | U.S.S.R. | 431/12 |

OTHER PUBLICATIONS

Mordell, D.L., "The Exhaust-Heated Gas-Turbine Cycle," ASME 49-F-6, 1949.

Foster-Pegg, R.W., and Davis, J.S., "A Coal Fired Air Turbine Cogeneration System," ASME 83-GT-181.

Foster-Pegg, R.W., "A 400 MW Combined Cycle Using Fluidized Combustion of Coal at Atmospheric Pressure," Inter Society Energy Conversion Energy Conference, Aug. 1984.

Smith, J., Strimbeck, D.C., Coates, N.H. and McGee, J.P., "Bureau of Mines Progress in Developing Open amd Closed-Cycle Coal-Burning Gas Turbine Power Plants," Transactions of the ASME, *Journal of Engineering of Power*, Paper No. 66-GT/CLC-7, 1966.

Foster-Pegg, R.W., "A Small Air Turbine Power Plant Fired with Coal in an Atmispheric Fluid Bed," ASME 89-GT-216, Jun. 1989.

Huang, F.F. and Naumowicz, T., "a Methodology for the Selection of Design Parameters for Externally-Fired Air-Turbine Cogeneration Systems, " IGTI-vol. 8, ASME Cogen-Turbo 1993, pp. 11-17.

(List continued on next page.)

*Primary Examiner*—Ira S. Lazarus
*Assistant Examiner*—Alfred Basichas
*Attorney, Agent, or Firm*—Donald M. Sandler

[57] ABSTRACT

An externally fired gas turbine system has a compressor for compressing ambient air and producing compressed air, an indirect-contact air heat exchanger for heating the compressed air to produce heated compressed air, an air turbine for expanding the heated and compressed air to produce expanded air, and a generator connected to the turbine for generating electricity that is supplied to a load. The system also includes a source of energy including solar energy, oil shale, solid waste fuel, land fill gas, biomass, or combinations thereof, and/or solid, liquid, or gaseous hydrocarbon fuels, for adding heat to the compressed air in the air heat exchanger and producing heat depleted gases that exit the air heat exchanger. Also provided is a closed Rankine cycle power plant having a water heat exchanger for vaporizing water and producing steam using heat contained in the heat depleted gases, a steam turbine for expanding the steam and producing power for the load, and expanded steam, a steam condenser for condensing the expanded steam and producing condensate, and means for returning said condensate to the water heat exchanger.

19 Claims, 11 Drawing Sheets

OTHER PUBLICATIONS

Foster–Pegg, R.W., "A Method for Assessing and Comparing the Potential Efficiencies of Advanced Fossil Fuelled Combined Cycles," IGTI–vol. 8, ASME Cogen–Turbo 1993, pp. 409–415.

Legerer, F.J., "Indirectly Fired Gas Turbine Cycle, Suitable for Biomass Combustion," IGTI–vol. 8, ASME Cogen–Turbo 1993, pp. 511–515.

"EFCC Cashes in Under Clean Coal 5," *Modern Power System Journal*, Jul. 1993, Wilmington Publishing,LTD.

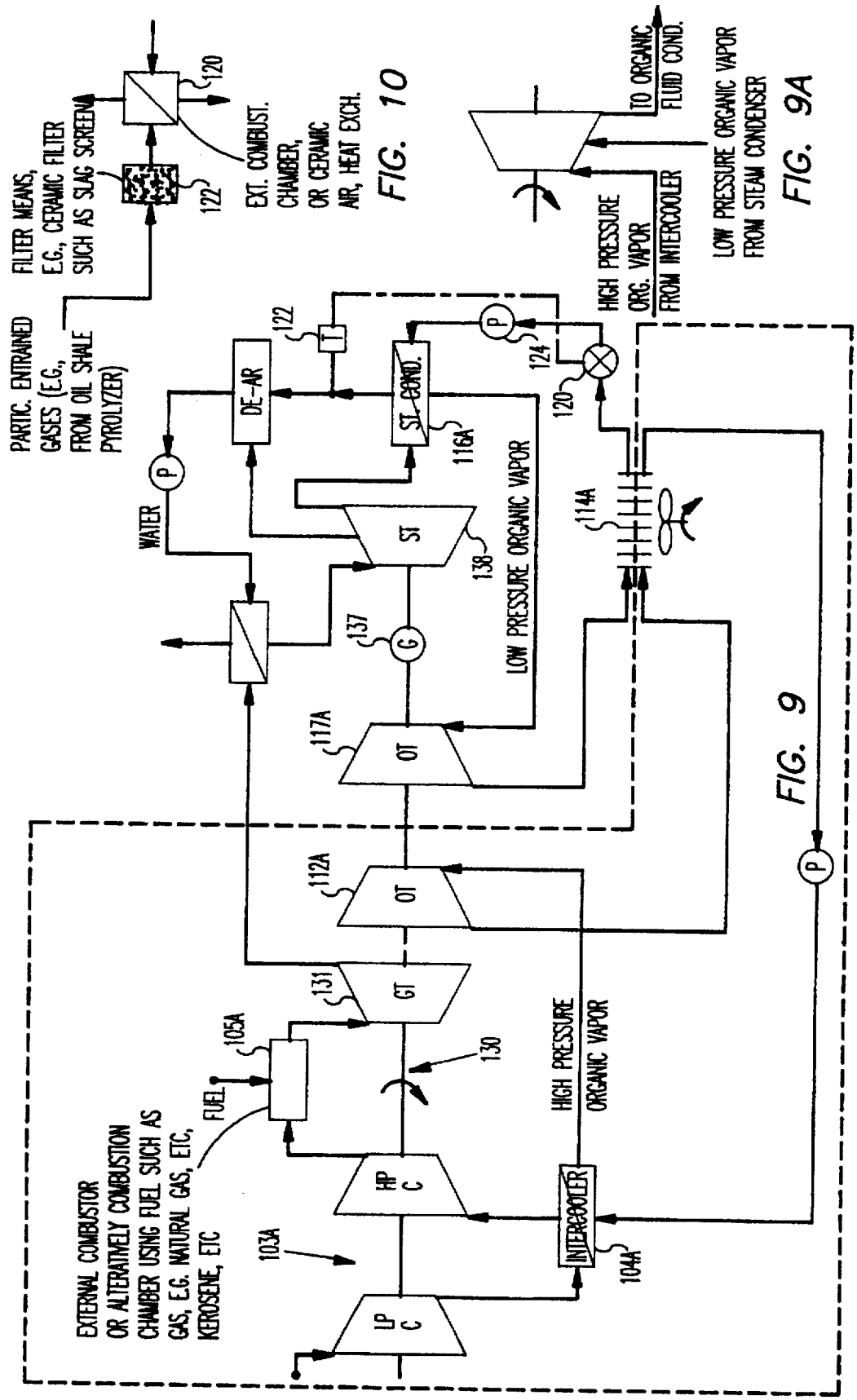

EXTERNALLY FIRED COMBINED CYCLE GAS TURBINE SYSTEM

RELATED APPLICATIONS

This application is a continuation in part of application Ser. No. 08/205,260 filed Mar. 3, 1994, which is a continuation in part of application Ser. No. 08/202,476 filed Feb. 28, 1994 all abandoned. The disclosures of each of these applications is hereby incorporated by reference.

FIELD OF THE INVENTION

This invention relates to externally fired combined cycle gas turbine systems which are sometimes referred to as EFGT Systems.

BACKGROUND OF THE INVENTION

Externally fired gas turbine/combined cycle systems have been described in the literature for a number of years. Such systems include a compressor for compressing ambient air, an indirect contact heat exchanger in which combustible products, e.g., gas and/or fuel vapors, hereinafter referred to as "combustible gases", are burned to heat the compressed air, and a turbine in which the heated compressed air is expanded driving a generator that produces electricity. Heat contained in the turbine exhaust is used to vaporize water that is converted into steam in a separate water-based, closed Rankine cycle power plant, the steam being expanded in a steam turbine in the power plant for driving a generator that produces additional electricity.

EFGT systems have been proposed for use with low calorific, unclean gaseous fuels as well as with hot gaseous fuels. Solid fuels are more difficult to incorporate into EFGT systems because of the problems associated with ash and noxious gases produced during the combustion process. It is therefore an object of the present invention to provide a new and improved externally energized gas turbine system such as an externally fired combined cycle gas turbine system which is capable of using solid fuels without many of the usual attendant problems associated with burning such fuel in a combined cycle gas turbine system.

BRIEF DESCRIPTION OF THE INVENTION

An externally energized gas turbine system such as an externally fired gas turbine system according to the present invention has a compressor for compressing ambient air and producing compressed air, an air heat exchanger for heating the compressed air to produce heated compressed air, a turbine for expanding the heated compressed air to produce expanded air, and a generator connected to the turbine for generating electricity. According to the present invention, the system also preferably includes what is termed "combustible products producing apparatus" for processing fuel to produce gas and/or fuel vapor collectively referred to hereinafter as "combustible gases", and an external combustion chamber for burning the combustible gases and transferring heat to the compressed air flowing through the air heat exchanger and producing heat depleted combustion products. The system also preferably includes a closed Rankine cycle steam power plant having a water heat exchanger for vaporizing water and producing steam using heat contained in the gaseous heat depleted combustion products. The power plant further includes a steam turbine for expanding the steam thereby producing power, and from which expanded steam exits, and a steam condenser for condensing the expanded steam producing condensate that is returned to the water heat exchanger.

In one embodiment of the invention, the water heat exchanger includes a preheater heated by the expanded air for heating the condensate and producing preheated water, and a vaporizer heated by the heat depleted combustion products for vaporizing the preheated water thereby producing steam for the turbine of the power plant.

In a preferred form of the invention, the combustible products producing apparatus includes a pyrolyzer for processing oil shale and producing combustible gases and a carbonaceous residue, and an air furnace for combusting the organic material remaining in the carbonaceous residue thereby producing hot flue gases and ash in the form of hot particulate. Means are provided for returning hot ash to the pyrolyzer. In this instance, the combustible gases produced by the pyrolyzer and the hot flue gases produced by the air furnace, together with solid particulate matter, constitute the combustible products produced by the processing of the oil shale by the combustible products producing apparatus.

In another embodiment of the invention, the water heat exchanger includes a superheater heated by the flue gases for superheating steam produced by the vaporizer. In another embodiment of the invention, the water heat exchanger includes a preheater heated by both the heat depleted combustion products and the expanded air (for heating the condensate thereby producing preheated water), and a vaporizer heated by the flue gases for vaporizing the preheated water.

In a further embodiment of the invention, the water heat exchanger includes a vaporizer heated by both the heat depleted combustion products and the expanded air for converting the condensate into steam. In such case, a second water-based, closed loop Rankine cycle power plant may be provided. The second power plant has a second water heat exchanger for vaporizing water and producing steam using heat contained in the flue gases produced by the gas producing apparatus, and a second steam turbine for expanding the steam and producing power and expanded steam. The second power plant also includes a second steam condenser for condensing the expanded steam exiting the steam turbine and producing condensate which is returned to the second water heat exchanger.

In a still further embodiment, heat depleted combustion products and expanded air heat an organic fluid in an organic fluid vaporizer producing organic vapor for operating an organic vapor turbine. In such case, the flue gases produced by the combustible products producing apparatus heat water in a water heat exchanger for vaporizing the water and producing steam for operating a steam turbine.

The organic vapor is supplied to the organic vapor turbine for producing power. Expanded organic vapor exits from the organic vapor turbine and is supplied to a condenser for producing organic fluid condensate. Steam produced in the water heat exchanger is supplied to the steam turbine for producing power. Expanded steam exhausted from the steam turbine is supplied to a steam condenser for producing steam condensate. In this embodiment, the expanded steam supplied to the steam condenser is cooled by organic fluid condensate and the resultant steam condensate is supplied to the water heat exchanger. Organic fluid condensate supplied to the steam condenser is thus preheated and then supplied to the organic fluid vaporizer. A second Rankine cycle organic fluid power plant is also included in this embodiment, the organic fluid being vaporized by heat extracted using an interstage cooler associated with the air compressor of the gas turbine. In the second Rankine cycle organic fluid power plant, organic vapor produced by cooling the interstage cooler is supplied to a second organic vapor turbine for producing power. Expanded organic vapor exhausted from the second organic vapor turbine is supplied to a condenser for producing organic fluid condensate which is supplied by a circulation pump to the interstage cooler.

In another aspect of the invention, where the source of energy includes solid fuel, or both solid and liquid fuel, or gaseous fuel which are burned, or even solar energy, means are provided for rapidly changing the rate at which liquid or gaseous fuel is burned in accordance with the electrical load. This permits the system, which has a large thermal mass associated with the air heat exchanger, to rapidly respond to rapid changes in the electrical load. As a result, the system can act essentially like a conventional gas turbine system in that the system can be used for peaking purposes.

A further approach that permits the system according to the present invention to rapidly respond to changes in the electrical load is to rapidly change, by a small amount, the rate of mass flow of air through the system, and/or the pressure ratio, in accordance with the electrical load, and to change the efficiency by a substantial amount. Specifically, the compressor characteristics are changed, for example, in response to load decreases by varying the attitude (angle) of adjustable vanes in the compressor, and/or bleeding a small amount of air from the compressor. The vane angle is chosen to lower the pressure ratio, and consequently the efficiency, and is achieved by actuating a load control connected to the vanes. When the heat exchanger reaches a new thermal steady state, the vane angle is readjusted to obtain optimal efficiency for the new load.

BRIEF DESCRIPTION OF THE DRAWINGS

Embodiments of the present invention are described by way of example with reference to the accompanying drawings wherein:

FIGS. 5A and 5B are modifications of the compressor-turbine arrangement shown in FIG. 5;

FIG. 9 is a block diagram showing a power plant into which a further embodiment of the invention has been incorporated;

FIG. 9A is an embodiment of an organic vapor turbine to be incorporated in the power plant shown in FIG. 9;

FIG. 10 shows an embodiment of the air heat exchanger or external combustion chamber of the present invention;

DETAILED DESCRIPTION

Figures 1, 1A:
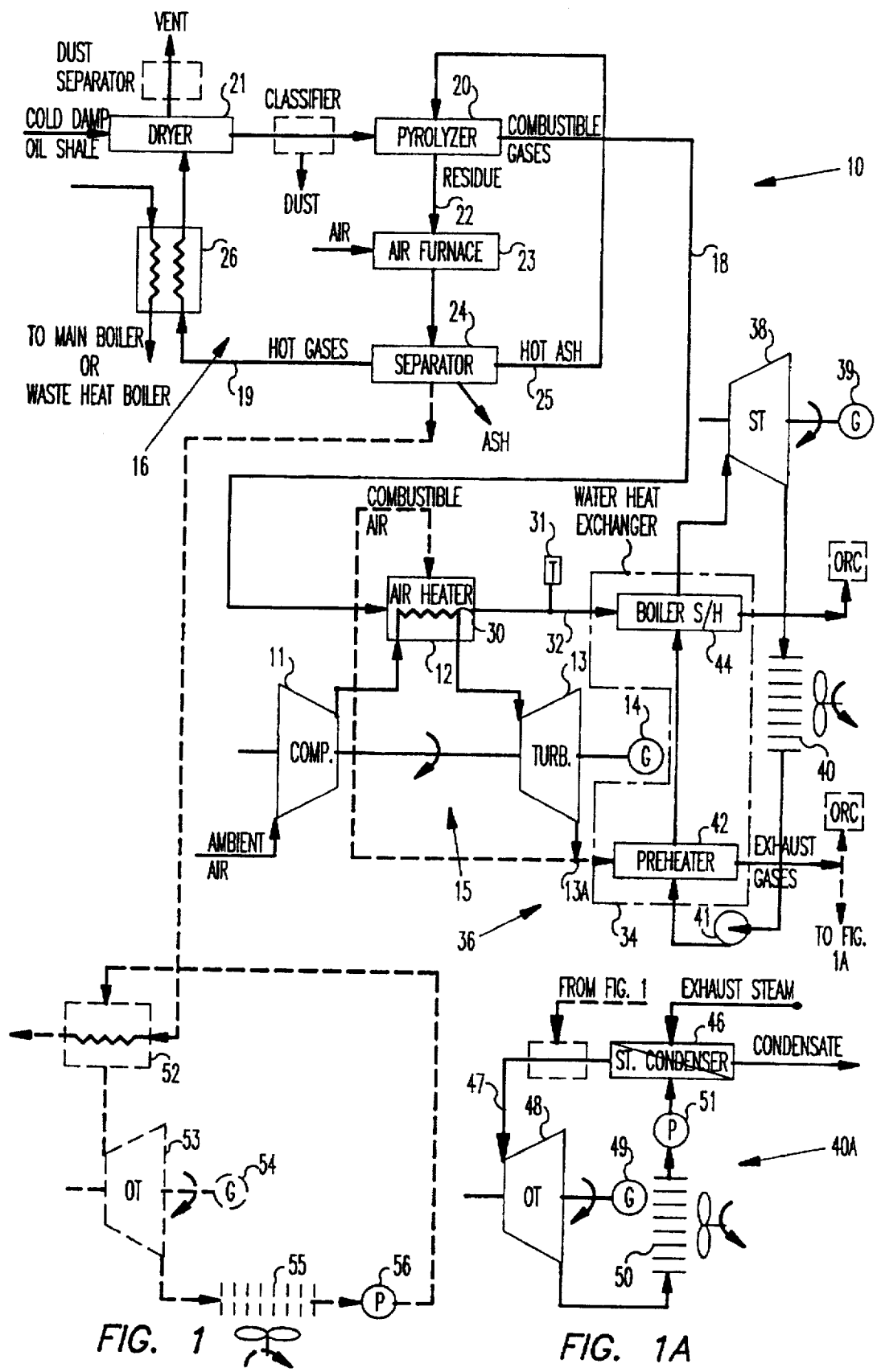
FIG. 1 is a block diagram of the present invention showing the preferred form of the combustible products producing apparatus and one embodiment of a water heat exchanger that is part of a water-based, closed Rankine cycle power plant.
FIG. 1A is a modification of the steam condenser shown in the power plant of FIG. 1.

Referring now to the drawings, reference numeral 10 designates an externally fired combined cycle gas turbine system according to the present invention. System 10 includes combustible products producing apparatus 16 (hereinafter, and in the drawings, referred to as "gas producing apparatus"), external combustion chamber 12, gas turbine system 15, and water-based, closed Rankine cycle power plant 36. Gas turbine system 15 includes compressor 11 for compressing ambient air and producing compressed air, indirect air heat exchanger 30 by which the compressed air is heated to produce heated compressed air, and air turbine 13 directly connected to and driving compressor 11 and generator 14. The heated compressed air expands in turbine 13 thereby driving the generator and producing electricity. Expanded air is exhausted from the turbine through exhaust line 13A. These components of turbine 15 are conventional and no further description is believed necessary.

Gas producing apparatus 16 processes fuel to produce combustible gases in line 18 and hot flue gases in line 19. In the preferred form of the invention, the gas producing apparatus includes pyrolyzer 20 for receiving crushed oil shale from dryer 21 and producing combustible gases in line 18 and carbonaceous residue in line 22. Apparatus 16 also includes air furnace 23 for combusting, in the presence of excess air, the organic material remaining in the carbonaceous residue produced by the pyrolyzer. Air furnace 23 produces at its output a combination of hot particulate or ash and hot flue gases which are applied to separator 24. The separator serves to separate the flue gases from the hot ash, the finer portion of which is delivered by line 25 to pyrolyzer 20 to sustain its operation. The coarser portion of the hot ash is removed. The hot flue gases, together with some fine ash remaining in the flue gases, are supplied to line 19 which applies the hot gases and the remaining particulate ash, to dryer 21 for the purpose of drying the oil shale before the latter is applied to the pyrolyzer.

Alternatively, the hot gases and fine particulate ash, or other matter still present together with the flue gases, first of all can be applied to heat exchanger 26 for extracting heat therefrom and heating, for example, a working fluid. In such case, heated or preheated working fluid then can be supplied to a water boiler such as boiler 44, or other boiler such as a waste heat boiler that uses, for example, an organic fluid like boiler 52 or a suitable boiler for organic turbine 48. In a further alternative arrangement, a portion of the hot flue gases and the remaining fine particulate ash or matter may be supplied directly to dryer 21. The other portion of the hot flue gases and remaining fine particulate ash or matter may be supplied first to heat exchanger 26 and then to dryer 21.

In the embodiment shown in FIG. 1, the combustible gases produced by pyrolyzer 20 are applied to external combustible chamber 12 with which air heat exchanger 30 is operatively associated. The combustible gases burn within the external combustion chamber usually in the presence of excess air, the heat so produced being transferred via air heat exchanger 30 to the air compressed by compressor 11 before the heated air is applied to air turbine 13. Heat depleted combustion products exit chamber 12 though line 32 which carries the combustion products to water heat exchanger 34 of closed Rankine cycle steam power plant 36. Water heat exchanger 34 vaporizes water and produces steam using heat contained in the heat depleted combustion products.

Power plant 36 includes steam turbine 38 for expanding the steam produced by water heat exchanger 34 and driving electric generator 39 connected to the turbine. Heat depleted steam exhausted from turbine 38 is applied to condenser 40, which is shown as being air cooled in FIG. 1, wherein the steam is condensed into condensate which pump 41 returns to the water heat exchanger to complete the water cycle of the power plant.

In the embodiment shown in FIG. 1, water heat exchanger 34 includes preheater 42 which is heated by heat depleted expanded air carried by exhaust line 13A of turbine 13. Water heat exchanger 34 also includes boiler 44 (and optionally a superheater associated therewith), which serves to vaporize (and optionally superheat) the preheated water furnished by the preheater. Boiler 44 is heated by heat depleted combustion products in line 32 produced by external combustion chamber 12.

Instead of using air cooled steam condenser 40, the arrangement illustrated in FIG. 1A can be substituted. Specifically, FIG. 1A shows steam condenser 40A as comprising indirect contact heat exchanger 46 which contains an organic fluid (such as n-pentane or isopentane, depending on operating conditions) that is vaporized as the steam in the condenser cools producing vaporized organic fluid in line 47. This vaporized fluid is applied to organic vapor turbine 48 within which the vaporized fluid expands driving generator 49 which produces electricity. The turbine exhausts expanded organic vapor into condenser 50, shown as being air cooled, wherein condensation takes place producing organic fluid condensate that is returned to condenser 46 by pump 51.

Optionally, some of the combustion air applied to the external combustion chamber 12 can be furnished by gas turbine 13 as shown by the broken lines in FIG. 1. Optionally also, a dust separator can be used as shown by the broken lines in FIG. 1 for extracting small particles from the heated and dried oil shale produced by dryer 21.

Alternatively, or in addition, fine particulate and/or dust can be removed using a suitable filter medium such as classifier apparatus, etc.

In another optional arrangement shown in FIG. 1, some, or all, of the flue gases produced by separator 24 of the gas producing apparatus can be utilized for generating electricity. If all of the flue gases are used, dryer 21 will not be used, and the raw oil will be supplied directly to the pyrolyzer.

Specifically, flue gases produced by separator 24 may be applied to indirect heat exchanger 52 before being vented to the atmosphere. Heat exchanger 52 contains an organic fluid which is vaporized and applied to organic turbine 53 wherein expansion takes place producing expanded organic vapor and driving generator 54 which produces electricity. The expanded vapor exhausted from turbine 53 is condensed in condenser 55, shown as air cooled, producing organic fluid condensate that pump 56 returns to heat exchanger 52.

In a further option in this embodiment, if preferred, heat remaining in heat depleted combustion products produced by external combustion chamber 12 exiting boiler 44 can be utilized, e.g., by producing electricity using, for instance, an organic Rankine Cycle power plant. In addition, heat remaining in expanded air exhausted from turbine 13 exiting preheater 42 can also be utilized, e.g., by producing electricity using, for instance, an organic Rankine cycle power plant. Furthermore, if preferred, alternatively, the heat remaining in expanded air exhausted from turbine 13 exiting preheater 42 can also be utilized, if the arrangement shown in FIG. 1A is used, for vaporizing the organic working fluid in a vaporizer with the vapors being supplied to turbine 48. In this case, steam condenser 46 would operate as a preheater for producing preheated organic fluid condensate supplied to the vaporizer which is also furnished with expanded air that exits preheater 42.

Figure 2:
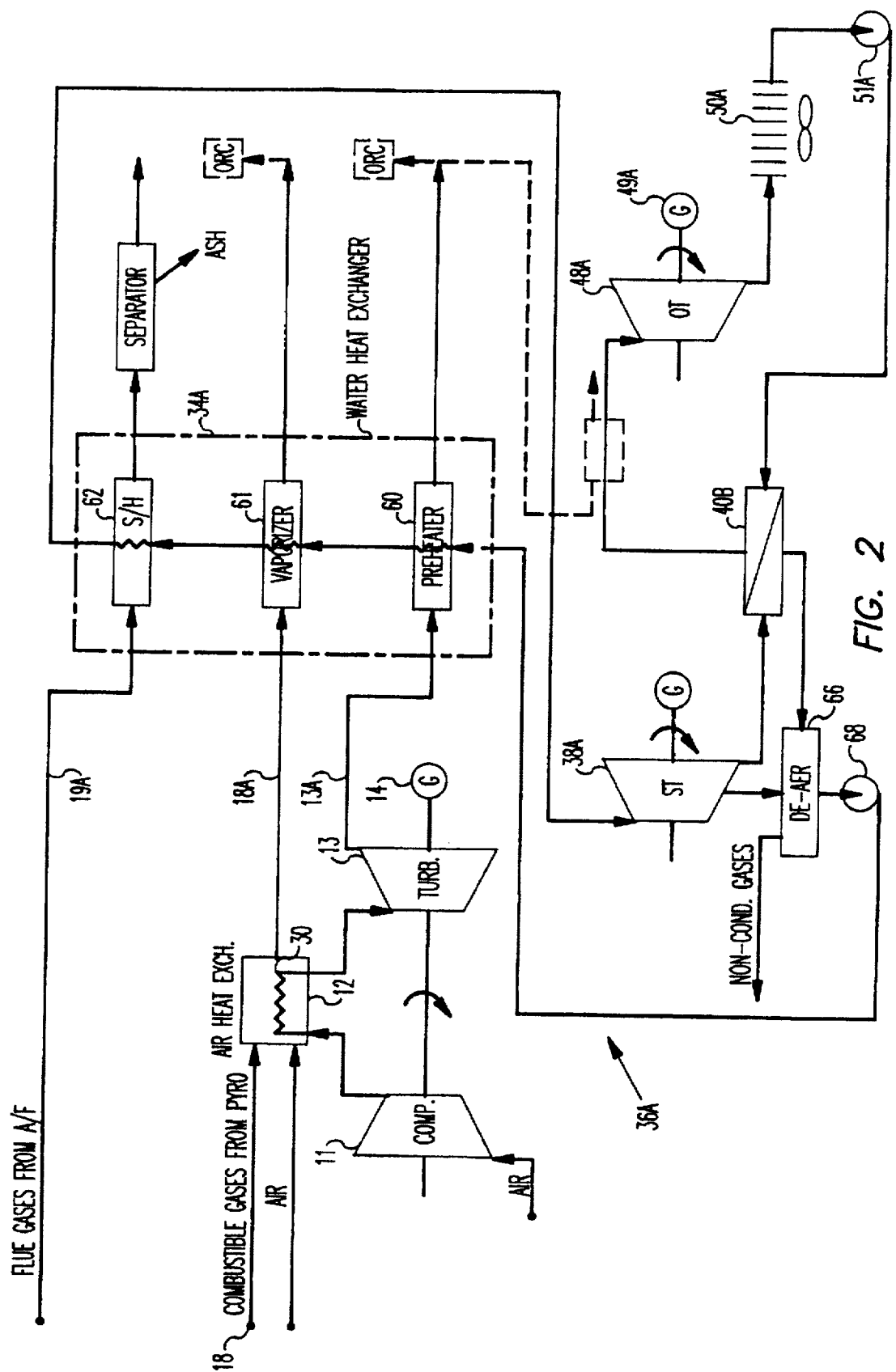
FIG. 2 is a block diagram of another embodiment of water heater according to the present invention.

In embodiment 36A of the invention shown in FIG. 2, water heat exchanger 34A includes preheater 60, vaporizer 61, and superheater 62. Flue gases from air furnace 23 are applied to superheater 62 of the water heat exchanger via line 19A and heat depleted combustion products produced by external combustion chamber 12 are applied via line 18A to vaporizer 61. Expanded air exhausted from turbine 13 is applied to preheater 60 via line 13A.

In operation, water in preheater 60 is preheated by the heat depleted air exhausted from turbine 13 and the preheated water is vaporized in vaporizer 61 by indirect contact with the heat depleted combustion products in line 18A. The steam produced by vaporizer 61 is superheated in superheater 62 utilizing the heat contained in the flue gases produced by separator 24 associated with line 19A. The superheated steam is applied to steam turbine 38A wherein expansion takes place producing expanded steam that is applied to condenser 40B containing an organic fluid. The steam condensate produced by condenser 40B is applied to deaerator 66 which is also supplied with steam bled from an intermediate stage of steam turbine 38A. Non-condensable gases contained in the steam separated in deaerator 66 are extracted. The liquid condensate in the sump of deaerator 66 is returned to preheater 64 by pump 68 completing the water cycle of the power plant.

As shown in FIG. 2, the organic fluid contained in condenser 40B is vaporized as the steam exhausted from turbine 38 condenses; and the vaporized organic fluid is applied to organic vapor turbine 48A connected to generator 49A. Expansion of the organic vapor takes place in the organic turbine causing the generator to produce electricity. Expanded organic vapor is exhausted from the turbine and applied to condenser 50A, shown as being air cooled, wherein the vapor is condensed to a liquid. The condensate so produced is returned by pump 51A to condenser 40B for completing the organic fluid cycle.

In this embodiment, if preferred, heat remaining in heat depleted combustion products produced by external combustion chamber 12 exiting vaporizer 61 can be utilized, e.g., by producing electricity using, for instance, an organic Rankine cycle power plant. In addition, heat remaining in expanded air exhausted from turbine 13 exiting preheater 60 can also be utilized, e.g., by producing electricity using, for instance, an organic Rankine cycle power plant. Furthermore, if preferred, alternatively, the heat remaining in expanded air exhausted form turbine 13 exiting preheater 60 can also be utilized for vaporizing the organic working fluid in a vaporizer with the vapors being supplied to turbine 48A. This optional arrangement is shown in broken lines in FIG. 2. In this case, condenser 40B would operate as a preheater for producing preheated organic fluid condensate that is supplied to the vaporizer.

Figure 3:
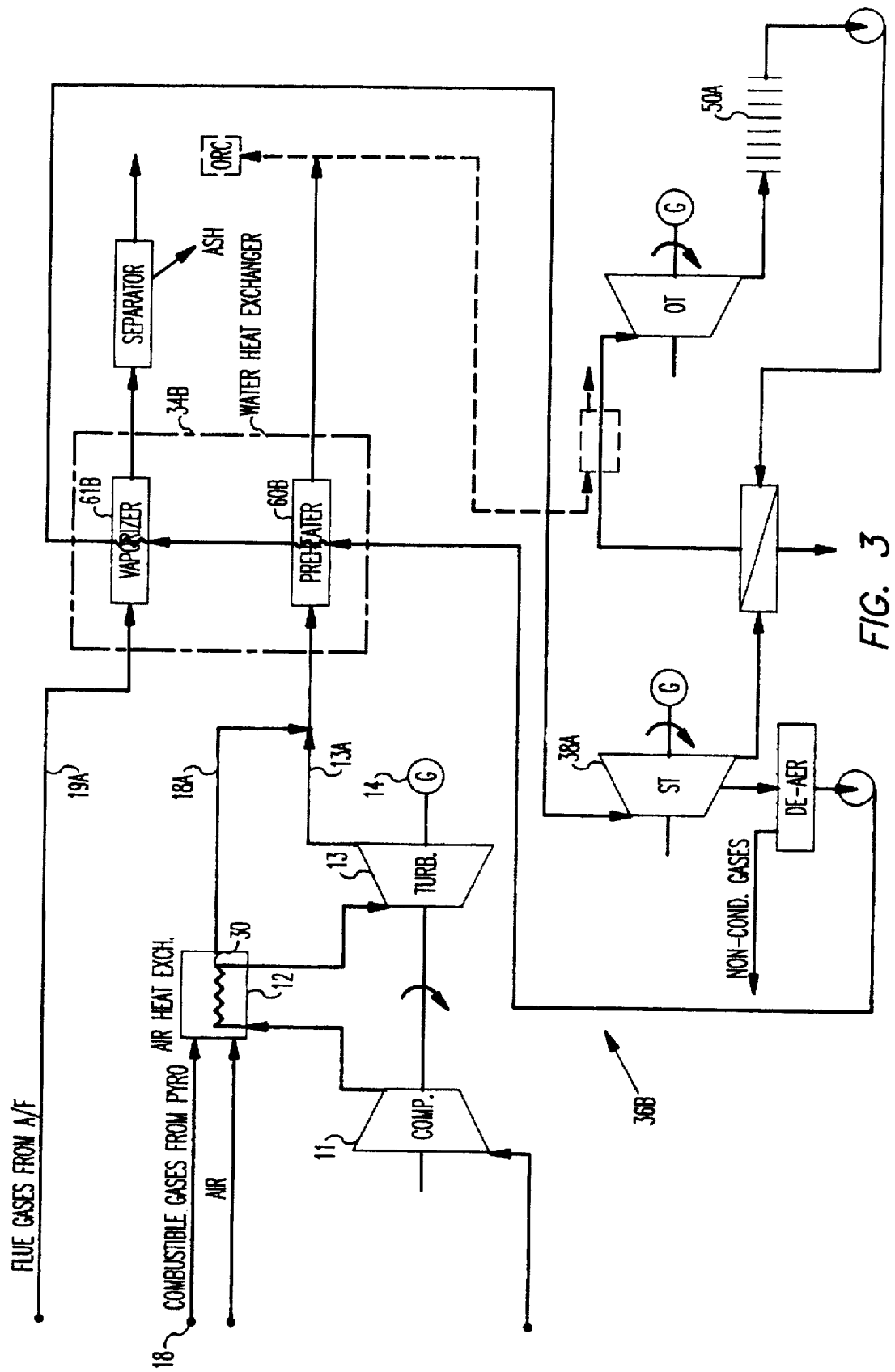
FIG. 3 is a block diagram of a further embodiment of a water heat exchanger according to the present invention.

In embodiment 36B of the invention shown in FIG. 3, water heat exchanger 34B includes preheater 60B and vaporizer 61B. In this embodiment of the invention, heat depleted combustion products in line 18A at the output of external combustion chamber 12 are combined with the expanded air in exhaust line 13A of turbine 13 and applied to preheater 60B for the purpose of preheating water that is supplied to vaporizer 61B. The flue gases from the air furnace of the combustion apparatus in line 19A are applied to vaporizer 60B producing steam which is applied to turbine 38A in the manner described in connection FIG. 2. Cooled flue gases exiting the vaporizer may be treated in a separator for the purpose of removing ash from the gases before they are vented to the atmosphere.

In this embodiment, if preferred, heat remaining in the combined flow of heat depleted combustion products produced by external combustion chamber 12 and expanded air exhausted from turbine 13 exiting preheater 60B can be utilized, e.g., by producing electricity using, for instance, an organic Rankine cycle power plant. Furthermore, if preferred, alternatively, the heat remaining in combined flow exiting preheater 60B can also be utilized for vaporizing the organic working fluid in a vaporizer with the vapors being supplied to turbine 48B. In this case, condenser 40C would operate as a preheater for producing preheated organic fluid condensate for supply to the vaporizer.

Figure 4:
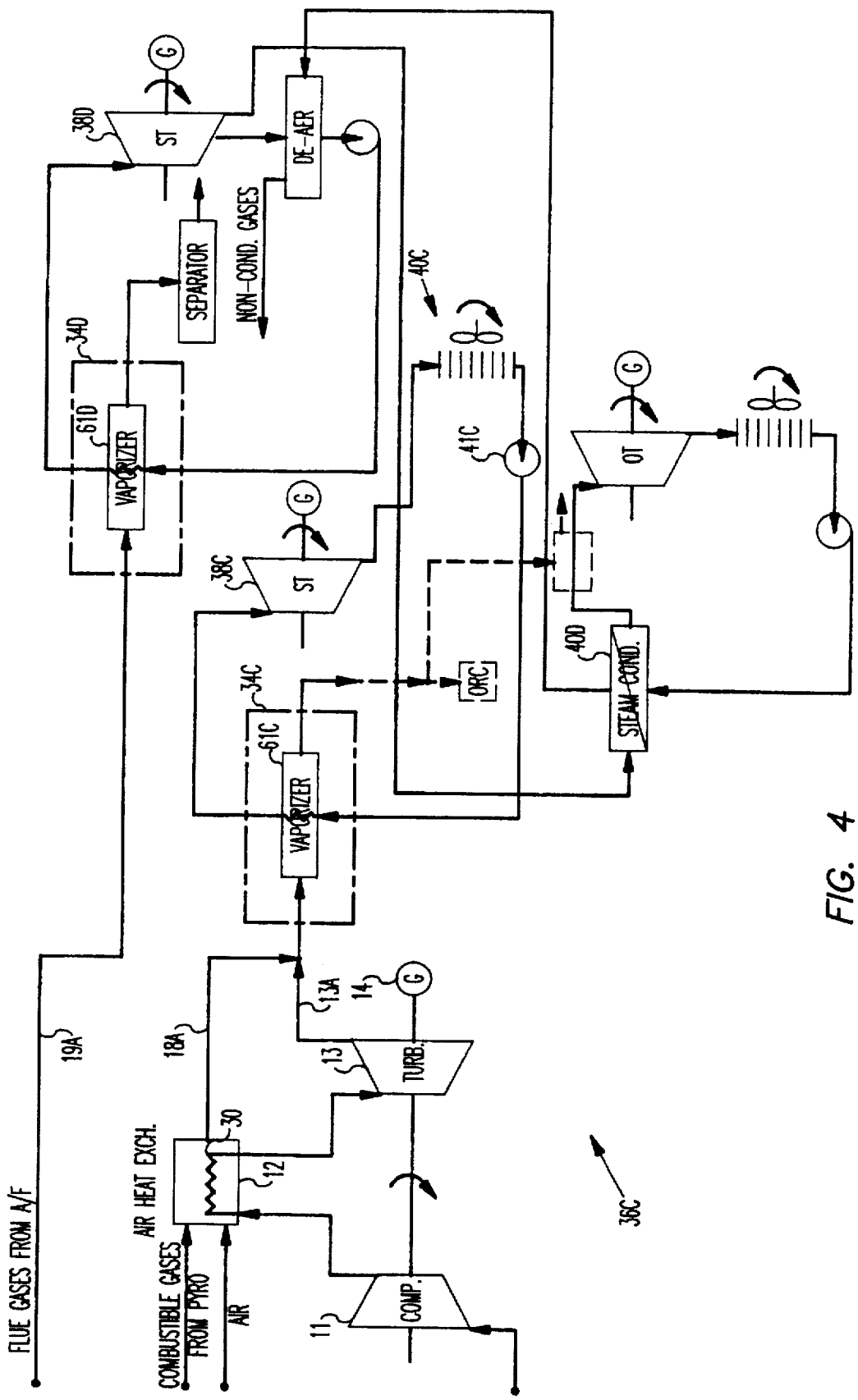
FIG. 4 is a block diagram of a further embodiment of a water heater according to the present invention.

In embodiment 36C of the invention shown in FIG. 4, water heat exchanger 34C includes only vaporizer 61C which is heated in an manner similar to the manner in which preheater 60B in FIG. 3 is heated. That is to say, the heat depleted combustion products in line 18A from the external combustion chamber are combined with expanded air in line 13A connected to the exhaust turbine 13; and the combined stream is applied to vaporizer 61C for the purpose of vaporizing water contained in the vaporizer. Specifically, vaporizer 61C is designed to raise the temperature of the water from the temperature of the steam condenser to the temperature of the steam without using a separate preheater. Steam produced by vaporizer 61C is applied to steam turbine 38C wherein expansion takes place producing expanded steam that is condensed in condenser 40C shown as being air-cooled. The condensate so produced is returned by pump 41C to vaporizer 61C.

In embodiment 36C of the invention, the flue gases in line 19A are applied to a separate, second water heater 34D containing vaporizer 61D. Water in vaporizer 61D is vaporized and applied to steam turbine 38D wherein expansion takes place producing expanded steam that is applied to condenser vaporizer 40D in an manner similar to that described in connection with FIG. 2.

In this embodiment, if preferred, heat remaining in the combined flow of heat depleted combustion products produced by external combustion chamber 12 and expanded air exhausted from turbine 13 exiting vaporizer 61C can be utilized, e.g., by producing electricity using, for instance, an organic Rankine cycle power plant. Furthermore, if preferred, alternatively, the heat remaining in combined flow exiting vaporizer 61C can also be utilized for vaporizing the organic working fluid in a vaporizer with the vapors being supplied to turbine 48C. In this case, condenser 40C would operate as a preheater for producing preheated organic fluid condensate for supply to the vaporizer.

Figure 5:
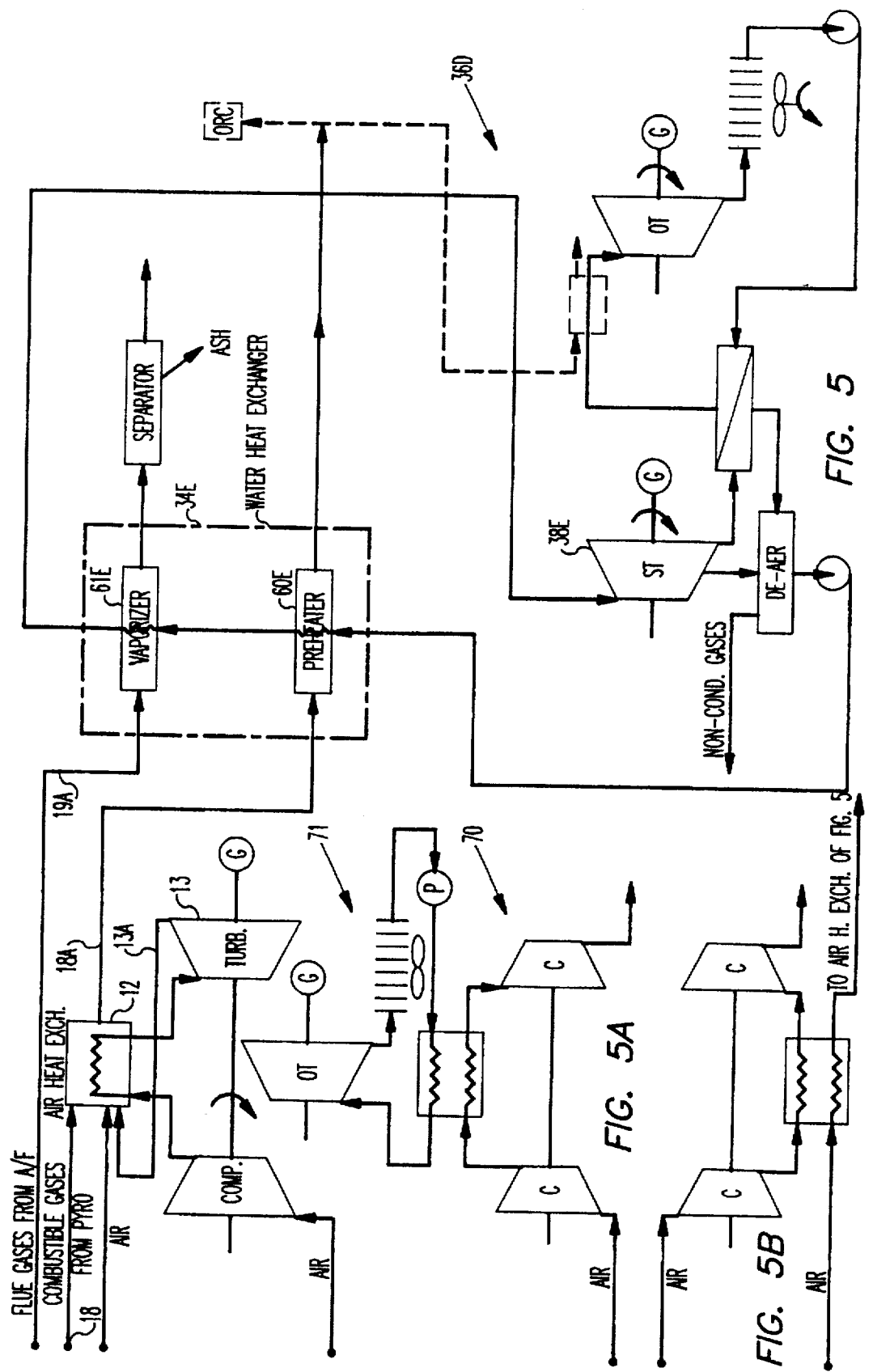
FIG. 5 is a block diagram of a further embodiment of a water heater according to the present invention.

In embodiment 36D of the invention shown in FIG. 5, water heat exchanger 34E includes preheater 60E and vaporizer 61E. In this embodiment, preheater 60E is supplied via line 18A with heat depleted combustion products from external combustion chamber 12 and vaporizer 61E is supplied via line 19A with flue gases from the air furnace for the purpose of vaporizing preheated water furnished by preheater 60E. The steam produced by vaporizer 61E is applied to steam turbine 38E in the same manner as described in connection with FIG. 2.

In the embodiment of the invention shown in FIG. 5, expanded air in line 13A produced by turbine 13 is fed back to external combustion chamber 12 for the purpose of supplying all or part of the air necessary for combustion in the external combustion chamber.

In this embodiment, if preferred, heat remaining in the heat depleted combustion products produced by external combustion chamber 12 exiting preheater 60E can be utilized, e.g., by producing electricity using, for instance, an organic Rankine cycle power plant. Furthermore, if preferred, alternatively, the heat remaining in the flow exiting preheater 60E can also be utilized for vaporizing the organic working fluid in a vaporizer with the vapors being supplied to a downstream turbine. In this case, the condenser associated with steam turbine 38E would operate as a preheater for producing preheated organic fluid condensate for supply to the vaporizer whose heat is derived from preheater 60E.

Modifications of the compressor-turbine arrangement of FIG. 5 is shown in FIGS. 5A and 5B. In FIG. 5A, compressor 70 represents the compressor of FIG. 5, and is separated into a high pressure stage and a low pressure stage. Interstage cooling is effected by an intercooler, the heat being rejected into a vaporizer of organic Rankine cycle power plant 71 having an organic vapor turbine, a condenser shown as being air cooled, and a cycle pump.

In FIG. 5B, interstage cooler 72 extracts heat from air compressed by the high pressure stage of the compressor, and supplies this heat to ambient air which may be supplied to heat exchanger 12 of FIG. 5. This arrangement provides heated, excess air to the heat exchanger.

Figure 6:
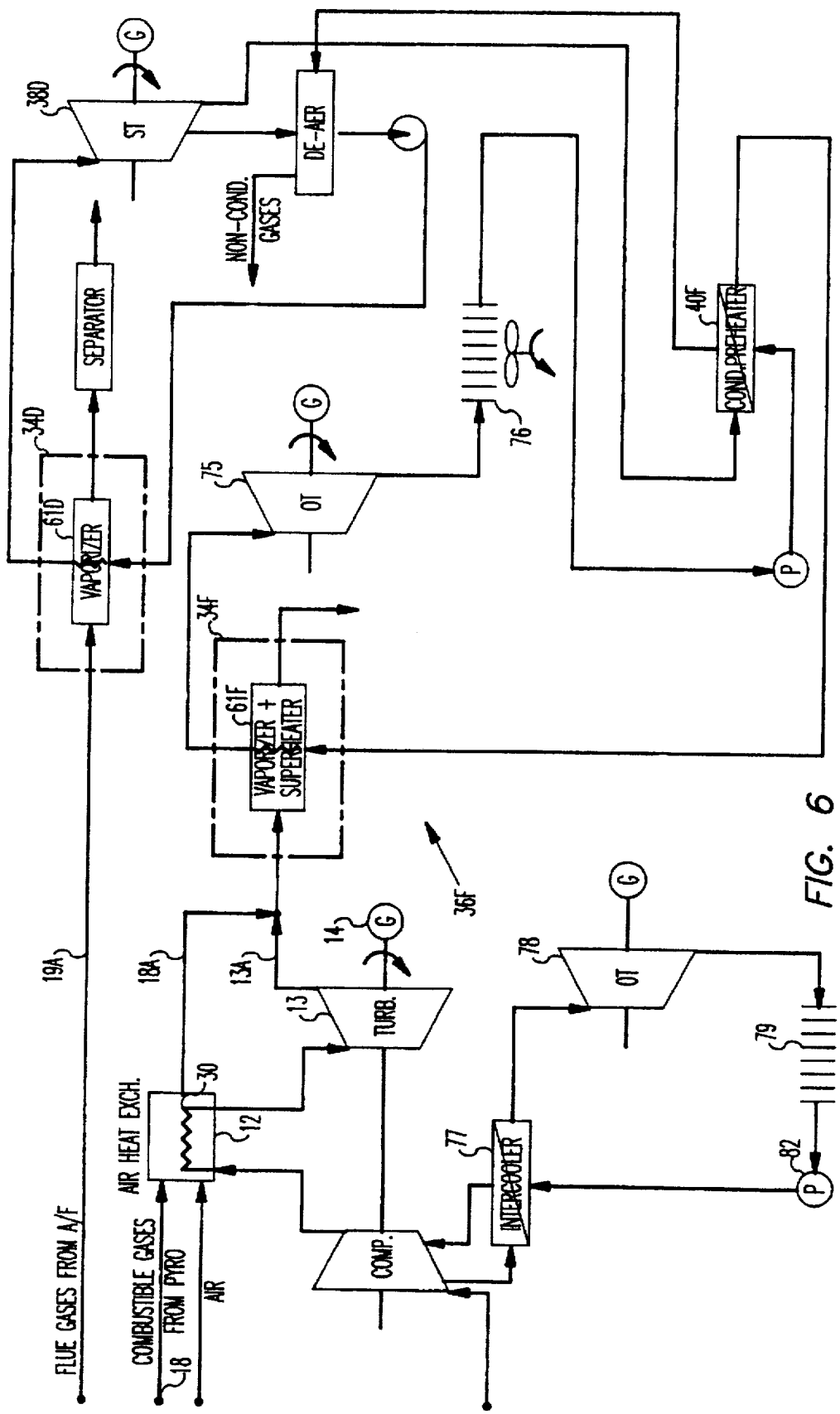
FIG. 6 is a block diagram of a further embodiment of the invention.

FIG. 6 is an embodiment similar to embodiment 36C of FIG. 4, but the organic turbine supplied with heat from steam condenser 40D is eliminated, and interstage cooling for compressor 11 is utilized. Specifically, embodiment 36F shown in FIG. 6 includes vaporizer 61F, which is heated by exhaust gases from turbine 13 and heat depleted combustion products produced by external combustion chamber 12, and serves to vaporize, and preferably superheat, preheated liquid organic fluid. The superheated organic fluid so produced is supplied to organic vapor turbine 75 which drives a generator. Expanded organic vapor exhausted from turbine 75 is condensed in condenser 76, which may be air cooled. The condensate is then pumped into condenser/preheater 40F which condenses steam exhausted from steam turbine 38D, and preheats organic fluid condensate produced by condenser 76. The preheated liquid organic fluid is then pumped into vaporizer/superheater 34F to complete the organic fluid loop. Finally, interstage cooler 77 is associated with compressor 11 is a part of second organic fluid Rankine cycle power plant 80 that is similar to the system shown in FIG. 5A.

In power plant 80, organic fluid is vaporized by heat extracted from gas turbine compressor 11 in interstage cooler 77. The organic vapor produced by cooling interstage cooler 77 is supplied to second organic vapor turbine 78 for also producing power. Expanded organic vapor that exits turbine 78 is supplied to condenser 79, shown as air cooled, for producing organic fluid condensate. The organic fluid condensate is supplied by circulation pump 82 to gas turbine intercooler 77 to complete this power cycle.

The embodiments described in relation to FIGS. 2 to 6, including FIGS. 5A and 5B, show flue gases being supplied by air furnace 23 to water vaporizer via line 19A. These flue gases may include all the flue gases and remaining fine ash particulate ash or material produced from separator 24. In such a case, dryer 21 will not be used and raw oil shale will be directly supplied to the pyrolyzer. Alternatively, the flue gases in line 19A may include only a portion of the flue gases and remaining fine ash particulate ash or material produced from separator 24. In such case, the remaining portion of the flue gases is supplied to dryer 21 as described in relation to FIG. 1.

Furthermore, while pyrolyzing of oil shale and the use of the gaseous products and other products produced by the pyrolyzing of oil shale is specifically mentioned above as the source of energy for operating the gas turbine and the combined cycle power plant, other fuels and sources of heat or energy can also be used in the present invention. For example, solar energy, combustion of coal directly or the products of gasification of coal, fuel oil, heavy fuel oil, land-fill gas, biomass, etc. can be used as the energy or heat source for operating the gas turbine and combined cycle power plant.

Furthermore, the combustion of oil shale, or other substances, together with other materials (e.g., other materials rich in sulfur) such as fuel rich in sulfur (e.g., petroleum coke), or other fuels as described, for example, in copending U.S. patent application Ser. Nos. 07/683,690, 07/835,358, 07/834,790, 07/834,871, 08/034,887, and 08/078,502 (the disclosures of which, and the disclosures of their continuations of which, are hereby incorporated by reference) can also be used as the energy or heat source for the gas turbine and combined cycle power plant. Moreover, the combustion of oil shale, or oil shale together with other materials (e.g.,other materials rich in sulfur, such as fuels), or other fuels, can be carried out by means other than pyrolyzing (for example, by using gases produced by the gasification of oil shale). In a further example, the oil shale or oil shale together with materials such as fuel can be combusted in a fluidized bed, examples of embodiments of which are shown in FIGS. 7 and 8.

Figure 7:
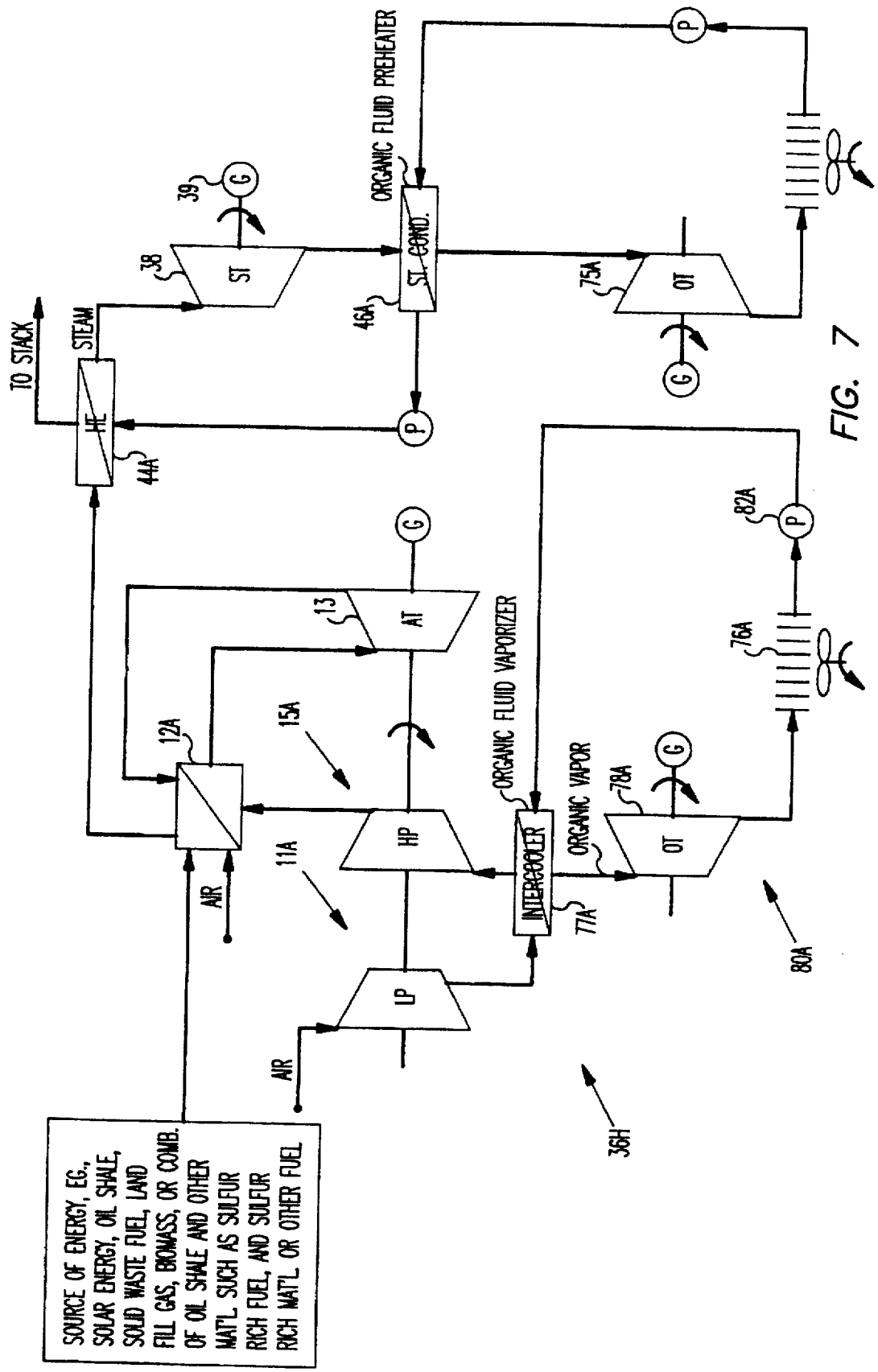
FIG. 7 is a block diagram of a further embodiment of the invention.
Figure 8:
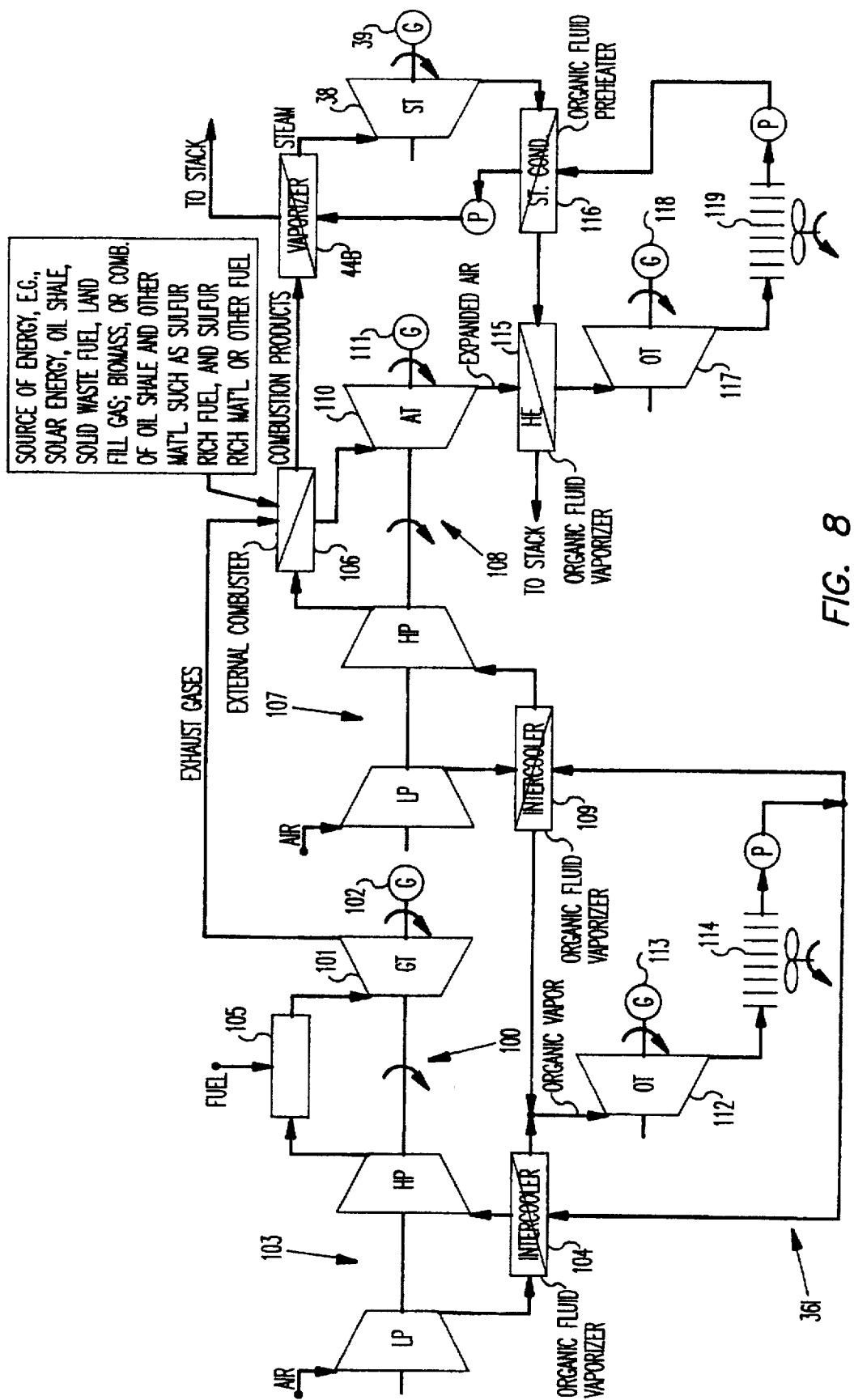
FIG. 8 is a block diagram of a further embodiment of the invention.

Embodiment 36H shown in FIG. 7 utilizes external combustion chamber 12A in which solid waste, for example, or other energy sources as shown in the drawing, is burned in the presence of air, or used, to indirectly heat compressed air produced by turbogenerator unit 15A. If preferred, a fluidized bed combustor can be utilized, or combustible products produced by the pyrolysis of oil shale, or oil shale together with other material, e.g., other material rich in sulfur such as sulfur rich fuels, or other fuels as described, for example, in the previously mentioned patent applications, can be used. The products of combustion produced by chamber 12A are applied to heat exchanger 44A where indirect contact with water occurs producing steam that is applied to steam turbine 38 driving generator 39. The resultant cooled combustion gases are then vented through a stack (not shown). If suitable, such combustion gases may be used to operate a waste heat converter, e.g., an organic Rankine cycle power plant.

Steam exhausted from turbine 38 is condensed in steam condenser 46A where liquid organic fluid is indirectly contacted and vaporized thereby. After the vaporized organic fluid is applied to organic vapor turbine 75A which drives a generator for generating electricity, the expanded organic vapor exiting turbine 75A is condensed, preferably in an air cooled condenser, and liquid organic fluid is pumped back into steam condenser 46A to complete the organic fluid cycle.

Second Rankine cycle organic fluid power plant 80A is also a part of this embodiment. In power plant 80A, organic fluid is vaporized by heat extracted from gas turbine compressor 11 in interstage cooler 77A. The organic vapor produced by cooling interstage cooler 77A is supplied to second organic vapor turbine 78A for also producing power. Expanded organic vapor that exits turbine 78A is supplied to condenser 76A, shown as air cooled, for producing organic fluid condensate. The organic fluid condensate is supplied by circulation pump 82A to gas turbine intercooler 77A to complete this power cycle.

In embodiment 36I shown in FIG. 8, turbogenerator 100 is a conventional gas turbine based arrangement in which turbine 101 drives generator 102 and compressor 103 having low pressure stage LP and high pressure stage HP. Interstage cooler 104 extracts heat from the air produced by the LP stage and vaporizes an organic fluid. The cooled air that exits from the interstage cooler is further compressed by the HP stage of the compressor and is supplied to combustor 105 where fuel is burned to produce hot combustion gases that are applied to gas turbine 101. Hot gases exhausted from this turbine are directed to external combustion chamber 106 wherein solid waste fuel, for example, is combusted producing hot products of combustion. Alternatively, other energy sources can be used including, but not limited to, solar energy, biomass, oil shale, oil shale together with materials such as other sulfur rich materials, or combustible products produced by the pyrolysis of oil shale, or oil shale together with other material, e.g., other material rich in sulfur such as sulfur rich fuels, or other fuels as described, for example, in the previously mentioned patent applications, can be used. If preferred, a fluidized bed combustor can be used. Furthermore, other energy sources, such as those listed in FIGS. 7 and 8, also can be used.

Heat in the hot products of combustion is indirectly transferred to compressed air produced by compressor 107 of turbogenerator 108 which is an air turbine based arrangement. Compressor 107 includes low pressure stage LP that produces compressed air that is cooled in interstage cooler 109 that serves to vaporize organic fluid.

The cooled air that exits interstage cooler 109 is further compressed by the HP stage of the compressor and is supplied to external combustion chamber 106 wherein the high pressure air produced by the HP stage of compressor 107 is indirectly heated and supplied to air turbine 110 that drives electric generator 111. The products of combustion produced by chamber 106 are applied to heat exchanger 44B where indirect contact with water occurs producing steam that is applied to steam turbine 38 driving electric generator 39. The resultant cooled combustion gases are then vented through a stack (not shown). If suitable, the combustion gases can be used to operate a waste heat converter, e.g., an organic Rankine cycle power plant. Finally, steam condensate produced in heat exchanger 116 by condensing expanded steam exiting steam turbine 38, is pumped back into vaporizer 44B completing the water cycle.

Vaporized organic fluid produced by intercoolers 104 and 109 is supplied to first organic vapor turbine 112 that drives electric generator 113. Expanded organic vapor that is exhausted from turbine 112 is condensed in condenser 114, preferably air cooled. The resultant condensate is pumped back to both intercoolers 104 and 109 to complete the first organic fluid cycle.

Air exhausted from air turbine 110 is supplied to heat exchanger 115 which vaporizes liquid organic fluid that had been preheated in steam condenser 116 within which steam exhausted from steam turbine 38 is condensed. Vaporized organic fluid produced by heat exchanger 115 is applied to second organic vapor turbine 117 that drives generator 118. Expanded organic vapor exhausted from turbine 117 is condensed, preferably in air cooled condenser 118, and pumped back to heat exchanger 116 completing the second organic fluid cycle.

Furthermore, since in the present invention, the gas turbine used is operated by heated air which is supplied to the inlet of the gas turbine without the direct contact of fuel and combustion products, the use of aeroderivative gas turbines is possible and is preferred.

The embodiments described in relation to FIGS. 5A, 6, 7 and 8 employ separate organic fluid power cycles for utilizing heat extracted from the intercoolers of the compressors associated with the gas turbines. If preferred, however, an alternative single dual pressure organic power cycle like that shown in FIG. 9 can be used. In this case, a single organic condenser 114A, shown as being air cooled, is used. As shown, single electric generator 137 driven by steam turbine 138, and by low pressure organic fluid turbine 112A and high pressure organic fluid turbine 117A, can be used for producing electricity. Alternatively, separate electric generators may be used.

If preferred, instead of using separate low pressure organic fluid turbine 117A and high pressure organic fluid turbine 112A, low pressure organic fluid can be injected at an intermediate stage of an organic vapor turbine to which high pressure organic fluid is supplied from intercooler 104A as shown in FIG. 9A. Valve 120 is controlled by temperature sensor 122 provided for sensing the temperature of the fluid exiting the steam condensate side of the steam condenser. Thus, valve 120 operates to ensure that sufficient organic fluid condensate is supplied to steam condenser 116A by feed pump 124 so that the temperature of the fluid exiting the steam condensate side of steam condenser 116A is such that steam condensate is always produced.

Alternatively, if preferred, instead of using steam turbine 128 in conjunction with low pressure organic vapor turbine 117A, a single organic Rankine cycle turbine can be used operating on the exhaust gases of gas turbine 131 and having an air or water cooled condenser. In a still further alternative, in the embodiment described in relation to FIG. 9, two separate organic vapor condensers can be used instead of single condenser 114 thus permitting two separate organic Rankine power cycles to be used.

Furthermore, even though in the previously described embodiments of the present invention, an external combustion chamber is used, the system of the present embodiment is also very advantageous when a gas turbine and steam turbine are used together in a combined cycle power plant where the gas turbine is not externally fired, but rather run by gas, such as natural gas, etc., or other suitable fuel, e.g., kerosene, etc. for combusting in combustion chamber 105A of the gas turbine to directly heat the compressed air exiting compressor 103A of gas turbine 130 also as shown in FIG. 9.

Additionally, the use of an organic Rankine cycle power plant utilizing heat extracted from the intercooler of a gas turbine similar in principle to that shown in FIG. 9 is also very advantageous even when the gas turbine is used solely for supplying power during peak electric demand and is not part of a combined cycle power plant. Thus, according to a further embodiment of the present invention (shown by the components enclosed by the dashed lines in FIG. 9), an organic Rankine cycle power plant utilizing heat extracted from the intercooler of a gas turbine can be used for producing power in a manner similar to that shown in the gas turbine portion of FIG. 9. In this embodiment as well, the combustion chamber of the gas turbine can be an external combustion chamber, or run by gas, such as natural gas, etc., or other suitable fuel, e.g., kerosene, etc. for directly heating the compressed gas exiting the compressor of the gas turbine.

Furthermore, when oil shale or other solid fuel or material is used in the present invention, its feeding rate can be controlled according to the present invention by a parameter of the power plant, such as the exit temperature of the external combustion chamber. Such temperature may be measured by a temperature sensor, such as sensor 31 shown, for example, at the exit of external combustion chamber 12 in FIG. 1, etc.

In an alternative embodiment of the present invention, external combustion chamber or air heat exchanger 12, 12A, 106, or 105A, may be a ceramic heat exchanger such as shown at 120 in FIG. 10. Additionally, filter means 122 shown in FIG. 10 may be a ceramic filter, e.g., a slag screen having ceramic tubes, located in line 18 or other lines supplying "combustible gases" to the external combustion chamber or air heat exchanger. Filter means 122 serves to filter solid particulate, such as ash, for minimizing, or substantially reducing the amount of solid particulate entering the external combustion chamber or air heat exchangers 12, 12A, 106, and 105A. The use of a ceramic heat exchanger having ceramic tubes or heat transfer elements permits relatively high temperatures to be maintained in the heat exchanger or combustion chamber thus allowing the gas turbine to operate at relatively high efficiency rates with a minimal or reduced susceptibility to corrosion or other factors which could bring about deterioration of the heat exchanger or combustion chamber, and thus increase cost, maintenance, and down-time of the power plant. Furthermore, the use of a filter having ceramic elements also permits high temperatures to be maintained in the gases or vapors or other material supplied to the external combustion chamber, and also provides protection for the air heat exchanger or external combustion chamber.

Furthermore, while the present invention in almost all of the embodiments, includes a combined cycle power plant (i.e., a power plant comprising a gas turbine as well as a steam turbine or other turbine or turbines operating on the gases exhausted from the gas turbine), the present invention specifically comprises a gas turbine externally energized by for example, an external combustion chamber combusting a fuel such as oil shale, or other fuels or combination of fuels or other energy sources previously mentioned. Alternatively, the present invention may comprise a gas turbine operated by a combustion chamber wherein other fuels such as natural gas, kerosene, etc., are combusted to directly heat compressed air exiting the compressor.

Figure 11:
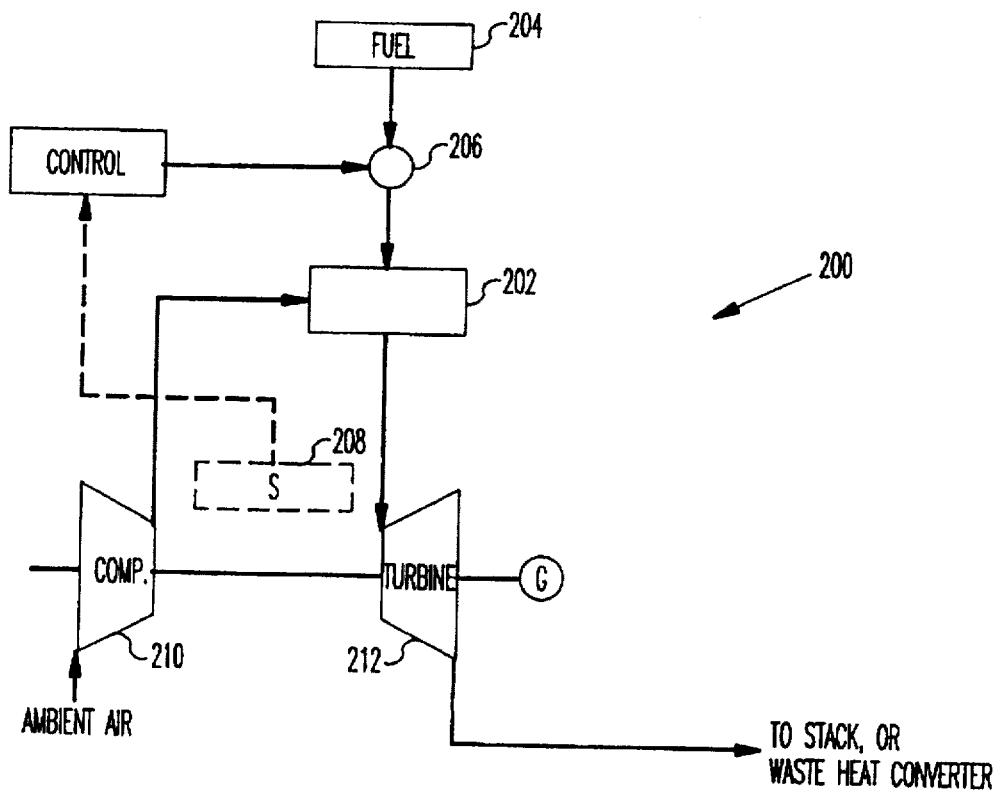
FIG. 11 shows a conventional gas turbine system to illustrate the facility with which the power output of the system can be changed rapidly in response to changes in the electrical load.

In conventional gas turbines, shown by way of example in FIG. 11 by reference numeral 200, internal combustion heat source 202 is provided in the form of a combustion chamber to which fuel supply 204 is connected through valve 202 which meters the fuel to the combustion chamber. Control of the electrical output is effected by controlling valve 206 in accordance with signals developed by sensor 208. Due to the low thermal inertia of the system (due to the limited size of the combustion chamber between compressor 210 and turbine 212, and the relatively small volume of air, gas involved) the response of the turbine is very fast. For example, if the electrical load is reduced, and power output has to be reduced, reducing the fuel supply reduces the power very quickly and there is no overspeed of the turbine as a result.

Figure 12:
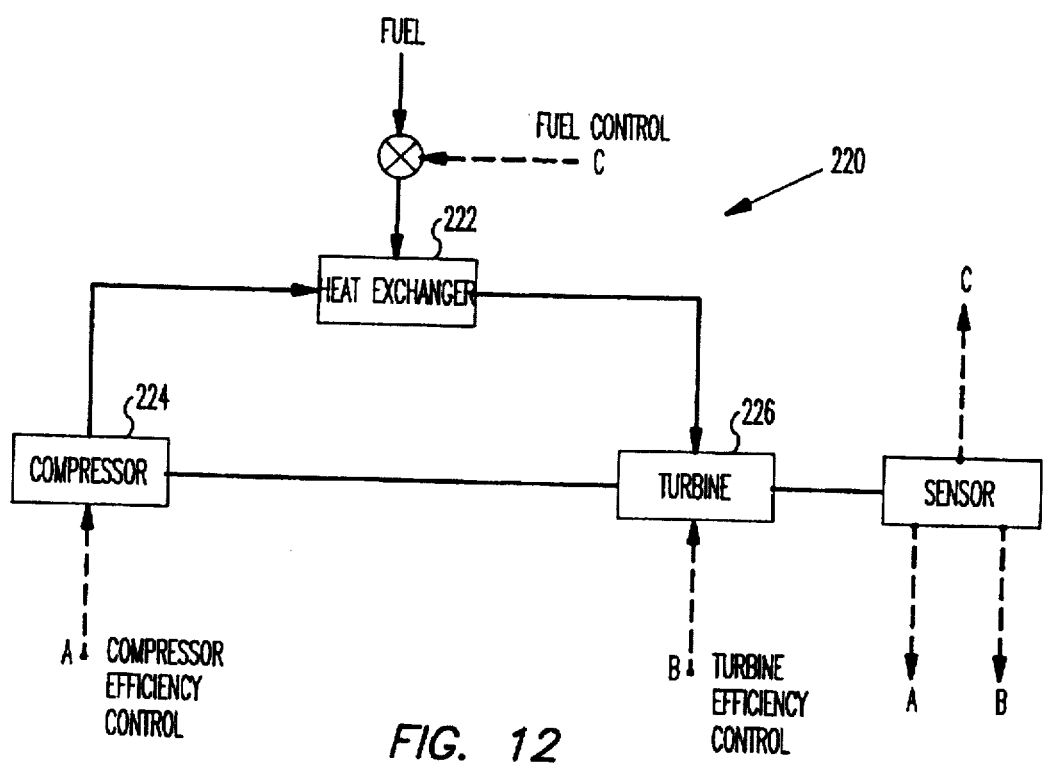
FIG. 12 is a schematic drawing of a system having a a heat exchanger with a large thermal capacity, and into which the present aspect of the invention is incorporated, showing techniques for improving the response time of the system to changes in the electrical load by controlling the efficiency of the compressor and/or turbine, and/or controlling the application of liquid or gaseous hydrocarbon fuel to the heat exchanger in accordance with the sensed value of the load.

In external combustion system 220, as previously described, and as illustrated in FIG. 12, heat exchanger 222 located between compressor 224 and turbine 226 is large and has a high thermal capacity because of, among other factors, the mass of metal from which the heat exchanger is constructed. And in addition, the large volume of the hot air between the last stage of the compressor and the first stage of expansion, has a large thermal capacity. In addition, some of the envisaged heating systems described previously, for example, fluidized beds, have even higher thermal inertia.

By reason of their inherent high thermal inertia, external combustion systems are not conducive to power peaking applications, and have been used almost exclusively for base line power production. Closing the air supply to the turbine or to the compressor using an external combustion system would permit quick control over the electrical output, but would stop or reduce the flow of air in the external heat exchanger and risk its overheating which would likely be destructive to the heat exchanger.

The present invention operates in conjunction with the high thermal inertia of external combustion systems by taking advantage of the fact that between half and two-thirds of the output of a gas turbine is used to run the compressor. Therefore, reducing the efficiency of the compressor, and eventually of the turbine, provides an approach to quickly absorbing the excess of energy in the flow avoiding the risk of turbine overspeed. At the same time, damage to the heat transfer surfaces of the heat exchangers by overheating is avoided by changing the mass flow through the heat exchanger by a small amount.

The invention comprises devices for reducing the efficiency by different means, for example, using small internal bypasses between critical points in the compressor and turbine so that, by reducing flow by a small amount, for example, using small valves, the pattern of the flow would be disturbed, and the efficiency thus reduced. The other possibility is to use some of the existing adjustable vanes on the compressor which are used for maintaining its efficiency at partial load and operating them to destroy the efficiency without reducing the flow. All of these devices must be used such that stalling of the compressor is avoided.

Figure 13A:
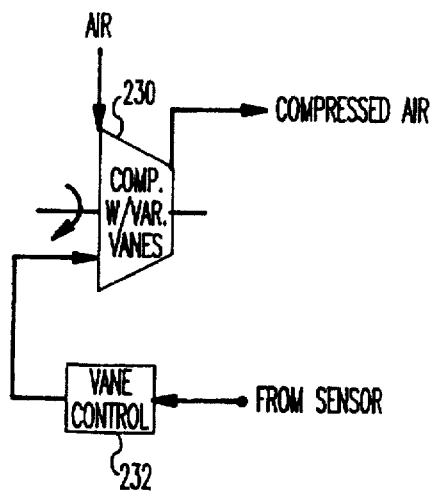
FIG. 13A is a schematic block diagram illustrating the control of the efficiency of a compressor by controlling the angular position of vanes of the rotor or stator in accordance with the sensed level of the load.

FIG. 13A illustrates schematically one approach to quickly reducing the efficiency of a compressor in response to changes in the electrical load. As shown, compressor 230 may be of the type having adjustable blades or vanes whose position is established by vane control 232 which received signals from a sensor that detects the electrical load. When the sensor (not shown) detects an incipient load reduction condition, vane control 232 issues a command that repositions the vanes in compressor 230 at positions which result in a reduction in the efficiency of the compressor which immediately effects a reduction in the power produced by the turbine (not shown) that drives the compressor.

Figure 14:
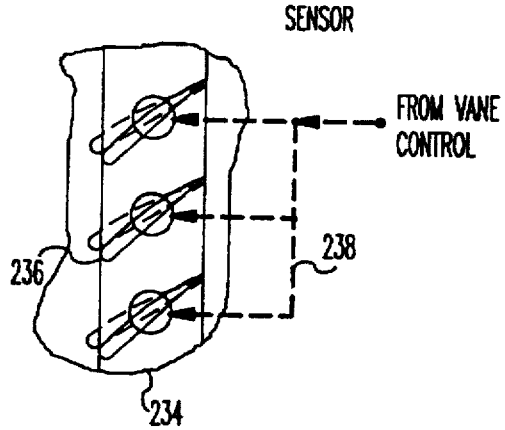
FIG. 14 shows, schematically, the shifting of the angular position of the vanes of a rotatable machine, such as a turbine or a compressor, in order to rapidly change the efficiency of the rotatable machine.

FIG. 14 illustrates schematically stator casing 234 carrying a plurality of vanes 236 mounted in the casing. The attitude, or angular position of the vanes is determined by actuators 238 controlled by the output of sensor 232.

Figure 13B:
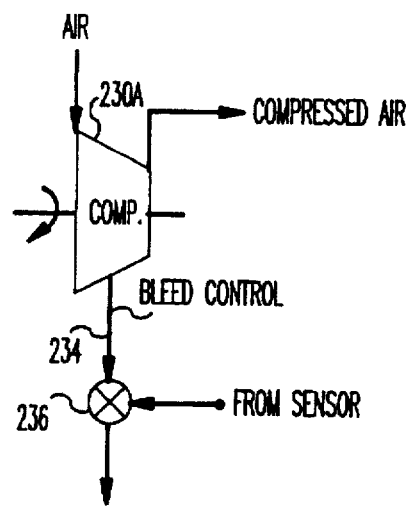
FIG. 13B is a schematic block diagram illustrating the control of the efficiency of a compressor of a turbine by controlling the amount of air that bleeds from the compressor in accordance with the sensed level of the load.

Alternatively, or in addition, compressor 230A may be provided with bleed lines 234 as shown in FIG. 13B. In such case, valve 236 controls and the amount of bleed-off; and valve 236 is responsive to signals from a sensor for rapidly opening to permit a small amount of bleeding when the electrical load suddenly decreases thus quickly decreasing the power produced by the turbine driving the compressor and furnishing power to the load.

Figure 15:
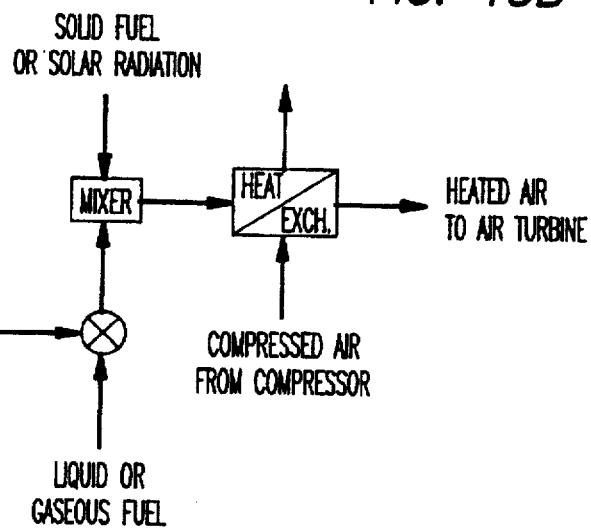
FIG. 15 shows, schematically, an energy source that includes solar heat, oil shale, solid waste fuel, land fill gas, biomass, or combinations thereof, and/or solid, liquid, or gaseous hydrocarbon fuels, for adding heat to compressed air in an air heat exchanger and producing heat depleted gases that exit the air heat exchanger.

An advantage lies in using hybrid fuels with an externally fired gas turbine to assist in rapidly responding to changes in electrical load on the system. FIG. 15 is such a hybrid fuel arrangement wherein solid fuels of the type described above are used in combination with liquid or gaseous hydrocarbon fuels. Thus, the solid fuels may be solid fuel such as powdered coal, oil shale, solid waste fuel, biomass, or combinations thereof, either mixed with liquid hydrocarbon fuels, or added directly to a combustion chamber that indirectly heats air supplied to an air turbine. When as sensor (not shown) signals a change in electrical load, the flow of the liquid or gaseous fuel can quickly be changes to effect the desired change in output of the turbine to which the compressor supplies air. Preferably, the amount of liquid or gaseous fuel to solid fuel is in the range 10–20% of the total heating value supplied to the combustion chamber. This approach is particularly advantageous when the system is used for peaking and it is necessary to rapidly increase the output of the power plant. In addition, if a rapid start is desired, such a start can be effected by initially using only liquid or gaseous fuel, and thereafter, gradually increasing the flow rate of solid fuel.

Figure 16:
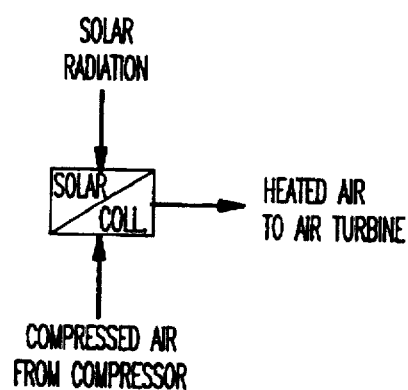
FIG. 16 schematically shows a solar collector arrangement for heating air compressed by a compressor.

Finally, the present invention is also applicable to a solar powered system in which compressed air is heated in a solar collector, either directly, or using an intermediate heat transfer fluid. This arrangement is illustrated in FIG. 16.

The advantages and improved results furnished by the method and apparatus of the present invention are apparent from the foregoing description of the preferred embodiment of the invention. Various changes and modifications may be made without departing from the spirit and scope of the invention as described in the appended claims.

We claim:

1. An externally fired gas turbine system having a compressor member for compressing ambient air and producing compressed air, an air heat exchanger for heating the compressed air to produce heated compressed air, an air turbine member for expanding the heated and compressed air to produce expanded air, and a generator connected to the turbine for generating electricity that is supplied to a load, said system comprising:

a) a source of heat including fuel that is burned in said air heat exchanger;

b) means for controlling the rate at which said fuel is burned in accordance with the electrical load; and c) means for varying the efficiency of at least one of said members in accordance with the electrical load.

2. A system according to claim 1 wherein said compressor member has a selectively controllable efficiency, and said system includes means for controlling the efficiency of said compressor member in accordance with the electrical load.

3. A system according to claim 1 wherein said air turbine member has a selectively controllable efficiency, and said system includes means for controlling the efficiency of said air turbine member in accordance with the electrical load.

4. A system according to claim 1 wherein each of said compressor member and air turbine member has a selectively controllable efficiency, and said system includes means for controlling the efficiency of said compressor member and said air turbine member in accordance with the electrical load.

5. A system according to claim 1 wherein said air heat exchanger is constructed and arranged to indirectly heat said compressed air and produce heat depleted gases as said fuel is burned.

6. A system according to claim 5 wherein said compressor member has a selectively controllable efficiency, and said system includes means for controlling the efficiency of said compressor member in accordance with the electrical load.

7. A system according to claim 5 wherein said air turbine member has a selectively controllable efficiency, and said system includes means for controlling the efficiency of said air turbine member in accordance with the electrical load.

8. A system according to claim 5 wherein each of said compressor member and air turbine member has a selectively controllable efficiency, and said system includes means for controlling the efficiency of said compressor member and said air turbine member in accordance with the electrical load.

9. A system according to claim 5 wherein said source of heat includes a pyrolyzer for processing oil shale and producing combustible products that include combustible gases constituting said fuel and a carbonaceous residue, an air furnace for combusting organic matter remaining in the carbonaceous residue and producing hot flue gases and hot ash, and means for supplying coarse hot ash separated from the hot ash to the pyrolyzer for sustaining its operation.

10. A system according to claim 9 wherein said compressor member has a selectively controllable efficiency, and said system includes means for controlling the efficiency of said compressor member in accordance with the electrical load.

11. A system according to claim 9 wherein said air turbine member has a selectively controllable efficiency, and said system includes means for controlling the efficiency of said air turbine member in accordance with the electrical load.

12. A system according to claim 9 wherein each of said compressor member and air turbine member has a selectively controllable efficiency, and said system includes means for controlling the efficiency of said compressor member and said air turbine member in accordance with the electrical load.

13. A system according to claim 9 wherein said system including a closed Rankine cycle power plant having a water heat exchanger for vaporizing water and producing steam using heat contained in said heat depleted gases, a steam turbine for expanding the steam and producing power for the load, and expanded steam, a steam condenser for condensing the expanded steam and producing condensate, and means for returning said condensate to said water heat exchanger.

14. A system according to claim 13 wherein said compressor member has a selectively controllable efficiency, and said system includes means for controlling the efficiency of said compressor member in accordance with the electrical load.

15. A system according to claim 13 wherein said air turbine member has a selectively controllable efficiency, and said system includes means for controlling the efficiency of said air turbine member in accordance with the electrical load.

16. A system according to claim 13 wherein each of said compressor member and air turbine member has a selectively controllable efficiency, and said system includes means for controlling the efficiency of said compressor member and said air turbine member in accordance with the electrical load.

17. A system according to claim 5 said source of heat includes solid fuel, and liquid or gaseous fuel, means for combining said solid fuel and said liquid or gaseous fuel before they are burned, and means for rapidly changing the rate at which liquid or gaseous fuel is burned in accordance with the electrical load.

18. An externally fired gas turbine system comprising:

a) a compressor member for compressing ambient air and producing compressed air;

b) an air heat exchanger for heating said compressed air to produce heated compressed air;

c) an air turbine member for expanding said heated compressed air to produce expanded air;

d) a generator connected to the turbine for generating electricity that is supplied to a load;

e) means connecting the members together so that the turbine member drives the compressor member;

f) a sensor for sensing said load; and g) apparatus response to said sensor for varying the efficiency of at least one of said members in accordance with said load.

19. A system according to claim 18 wherein said air heat exchanger includes a solar collector.

* * * * *